United States Patent [19]

Ohkanda

[11] Patent Number: 4,889,215
[45] Date of Patent: Dec. 26, 1989

[54] ANTI-OVERLOAD CENTRIFUGAL CLUTCH
[75] Inventor: Masao Ohkanda, Sagamihara, Japan
[73] Assignee: Kioritz Corporation, Tokyo, Japan
[21] Appl. No.: 262,011
[22] Filed: Oct. 25, 1988

Related U.S. Application Data

[63] Continuation of Ser. No. 61,012, Jun. 1, 1987, abandoned.

[30] Foreign Application Priority Data

Dec. 8, 1986 [JP] Japan .................. 61-187987

[51] Int. Cl.$^4$ .................. F16D 43/18; F16D 43/30
[52] U.S. Cl. .................. 192/48.1; 192/103 B; 192/104 C; 192/105 BA
[58] Field of Search ............ 192/48.1, 72, 79, 103 B, 192/104 C, 105 BA, 107 T

[56] References Cited

U.S. PATENT DOCUMENTS

| | | | |
|---|---|---|---|
| 704,575 | 7/1902 | Pintsch | 192/104 C X |
| 1,927,509 | 9/1933 | Waterhouse | 192/103 B |
| 2,027,941 | 1/1936 | Waterhouse | 192/103 B |
| 2,860,519 | 11/1958 | Cavanaugh | 192/104 C |

FOREIGN PATENT DOCUMENTS

| | | |
|---|---|---|
| 677239 | 6/1939 | Fed. Rep. of Germany . |
| 2550953 | 5/1977 | Fed. Rep. of Germany . |
| 3432147 | 4/1985 | Fed. Rep. of Germany . |

Primary Examiner—Rodney H. Bonck
Assistant Examiner—Richard M. Lorence
Attorney, Agent, or Firm—Browdy and Neimark

[57] ABSTRACT

An anti-overload centrifugal clutch including a centrifugal clutch having a clutch drum secured to a driving shaft thereof and a group of centrifugal clutch shoes engaged with a driven shaft for contact with and movement away from the clutch drum. A group of centrifugal members are engaged with the driving shaft which are respectively forced to embrace the driven shaft by the action of an associated spring. The centrifugal members release this embrace when the rotation of the driving shaft reaches a predetermined rotational speed.

6 Claims, 2 Drawing Sheets

ANTI-OVERLOAD CENTRIFUGAL CLUTCH

BACKGROUND OF THE INVENTION

1. Field of the Invention

This application is a continuation of application Ser. No. 061,012, filed June 1, 1987, now abandoned.

The present invention relates to an anti-overload centrifugal clutch.

2. Description of the Prior Art

In a typical centrifugal clutch, when an overload acts upon a driven side thereof, a difference may occur between the speed of rotation of a shaft on the driven side and that of a shaft on the driving side. Thus, slippage occurs between a clutch drum and corresponding centrifugal clutch shoes, and this may lead to a risk of the resultant friction producing overheating or anomalous friction. For example, in a case where the chain saw of an automatic pruning machine becomes jammed while cutting a tree branch, slippage occurs in its centrifugal clutch which serves to transmit driving power to the chain saw of the pruning machine, and thus the centrifugal clutch becomes overheated. This may result in the drawback of the centrifugal clutch's life being reduced to an extreme extent.

SUMMARY OF THE INVENTION

1. Object of the Invention

It is therefore an object of the present invention to provide an anti-overload centrifugal clutch in which the aforesaid drawback of such prior-art centrifugal clutch is eliminated and which has a simple and useful configuration.

2. Brief Summary of the Invention

Specifically, an anti-overload centrifugal clutch of the present invention essentially comprises: a centrifugal clutch having a clutch drum secured to a driving shaft thereof and a group of centrifugal clutch shoes engaged with a driven shaft for contact with and movement away from the clutch drum; and a group of centrifugal members engaged with the driving shaft, the respective centrifugal members being forced to embrace the driven shaft by the action of an associated spring, and the respective centrifugal members releasing this embrace when the rotation of the driving shaft reaches a predetermined rotational speed.

In the arrangement of the present invention, when the driving shaft starts to rotate about its axis, rotational drive of the driving shaft is transmitted to the driven shaft through the centrifugal members which embrace the driven shaft, thereby causing rotation of the driven shaft about its axis. When the rotational speed further increases up to a predetermined rotational speed, the centrifugal clutch shoes in the centrifugal clutch are forced against the inner wall of the clutch drum by the action of centrifugal force. Thus, the driving force of the driving shaft is properly transmitted to the driven shaft through the centrifugal clutch and at the same time the centrifugal members are separated from the driven shaft by the action of the centrifugal force which is greater than the biasing force of the spring. When the rotation of the driven shaft is decelerated or stopped because of an overload imposed thereon, the level of the centrifugal force acting upon the centrifugal clutch shoes in the centrifugal clutch is reduced, and transmission of the driving power is thereby stopped. In this state, since the load acting upon the driving shaft is reduced, the rotational speed of the driving shaft again increases. Thus, the centrifugal members are maintained in a state separated from the driven shaft. Therefore, the power transmission from the driving shaft to the driven shaft is intercepted without the occurrence of unwanted slippage. Specifically, when the rotation of the driven shaft is reduced or stopped by the imposition of an overload upon the driven shaft, the centrifugal clutch is instantly disengaged. Accordingly, it is possible to prevent the occurrence of accidents due to frictional heat which might be produced by the slippage between the clutch drum and the shoes while the clutch is engaged. In addition, the centrifugal clutch of the invention has a simple structure and can be positively operated.

BRIEF DESCRIPTION OF THE DRAWINGS

Further objects, features and advantages of the present invention will be apparent from the following description of a preferred embodiment of the present invention with reference to the accompanying drawings; in which.

DESCRIPTION OF THE PREFERRED EMBODIMENT

Figure 1:
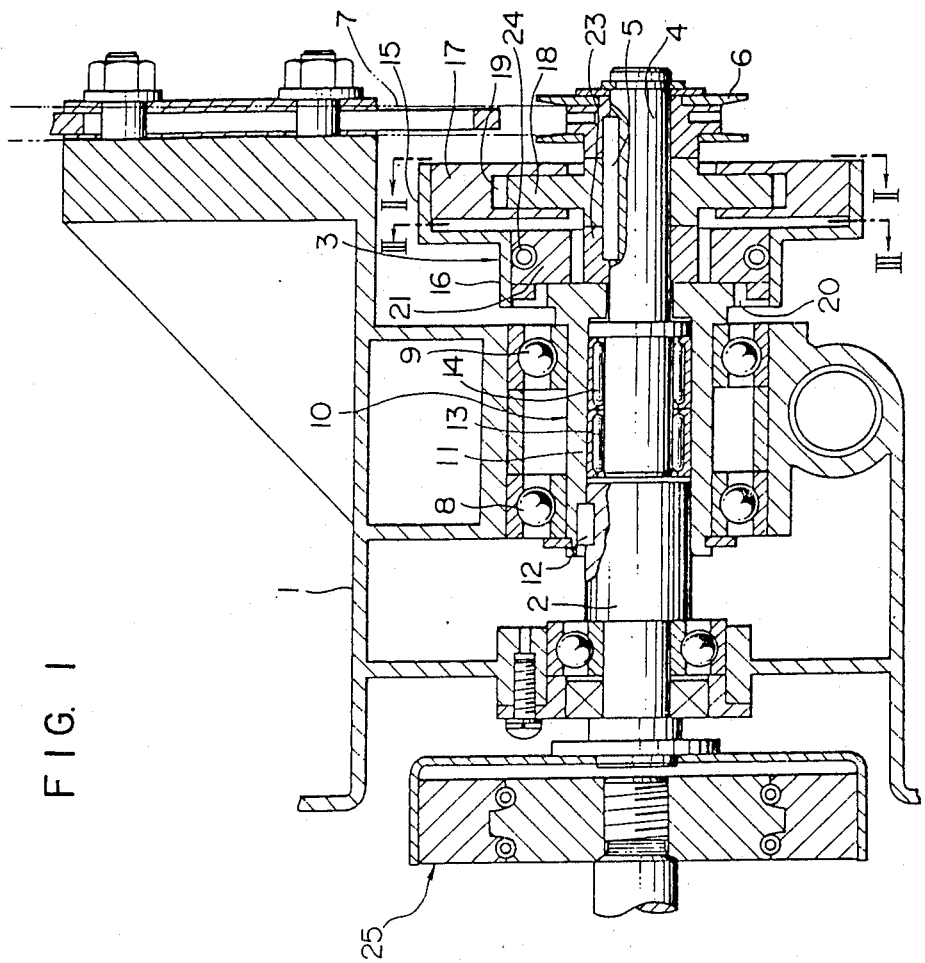
FIG. 1 is a sectional view of the essential portion of an automatic pruning machine in accordance with the present invention.
Figure 2:
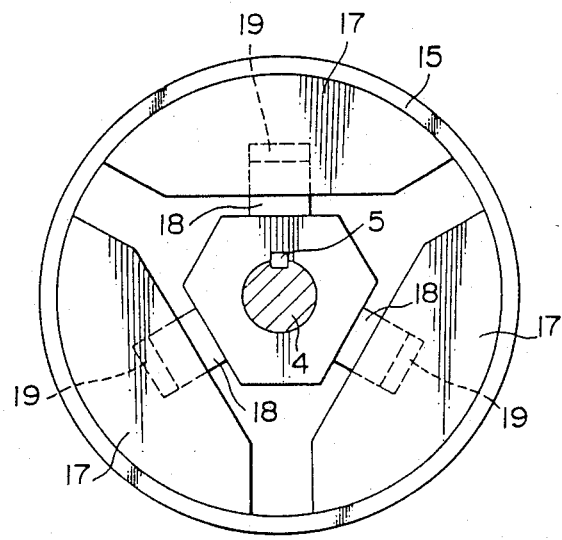
FIG. 2 a view taken along the line II—II of FIG. 1.

A preferred embodiment of the present invention will be described below with reference to FIGS. 1 to 3.

The presently preferred embodiment is an example in which the anti-overload centrifugal clutch is applied to a chain saw disposed on the cutting portion of an automatic pruning machine. The automatic pruning machine has: a driving shaft 2 connected via a clutch 25 to an internal combustion engine (not shown) mounted as a power source on a body 1, the driving shaft 2 being driven to rotate about its axis by the power supplied from the engine; an anti-overload centrifugal clutch 3 disposed in coaxial relationship with the driving shaft 2; a driven shaft 4 drivably connected to the driving shaft 2 via the anti-overload clutch 3 of the invention; and a saw chain 7 driven to cut the branches of a tree in engagement with a sprocket 6 mounted on the driven shaft 4 by a key 5.

The anti-overload centrifugal clutch 3 has a sleeve-shaped driving member 10 rotatably supported on the body 1 via bearings 8 and 9, the driving member 10 having a sleeve portion 11 receiving at its one end a corresponding end of the driving shaft 2 with the driving member 10 connected by a key 12 to the driving shaft 2. The driving member 10 receives at the other end an inner end portion of the driven shaft 4, the driven shaft 4 being supported by bearings 13 and 14 for free rotation with respect to the driving member 10.

The driving member 10 has at an external end of the sleeve portion 11 a clutch drum 15 and a cylindrical portion 16 formed inwardly thereof, both of which are integrally formed in coaxial relationship. The clutch drum 15 has an internal diameter greater than the outer diameter of the sleeve portion 11 and the cylindrical portion 16 has an internal diameter greater than the external diameter of the sleeve portion 11 but smaller than the internal diameter of the clutch drum 15. A group of three centrifugal clutch shoes 17 are disposed for frictional engagement with the clutch drum 15, and are guided by associated boss members 18 as shown in FIG. 2. The respective boss members 18 are spaced apart at intervals of an equal angle in the circumferential direction of the clutch drum 15 and formed to extend outwardly in the radial direction. Specifically, grooves 19 are radially recessed in the respective shoes 17. The respective groove 19 movably receives the corresponding boss member 18, and guide the shoes 17 for sliding movement in the radial direction with engaging the shoes 17 with the driven shaft 4.

Figure 3:
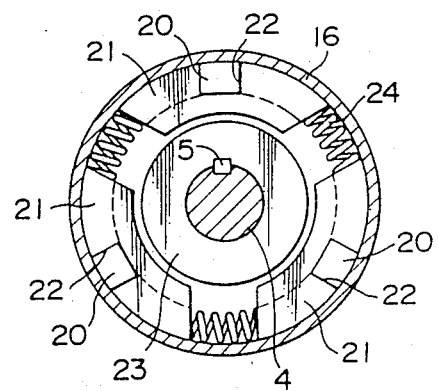
FIG. 3 is a view taken along the line III—III of FIG. 1.

As shown in FIG. 3, the cylindrical portion 16 has three projection members 20 which project radially inwardly from the cylindrical portion 16, the respective projection members 20 being spaced apart at intervals of an equal angle along the inner circumference of the cylindrical portion 16. The respective centrifugal member 21 is movably fitted at a radial groove 22 thereof onto the projection member 20, and guided for sliding movement in the radial direction in engagement with the driving shaft 2. On the other hand, a cylindrical member 23 having a smooth outer periphery is secured to the driven shaft 4 by a key 5, and the outer periphery of the cylindrical member 23 is arranged in face-to-face relationship with the respective circular surfaces of the radially inner sides of the centrifugal members 21. Adjacent ones of the centrifugal members 21 are respectively connected by a spring 24, and the spring 24 acts to bias the centrifugal members 21 inwardly in the radial direction, thereby bringing the respective circular surfaces of the radially inner sides of the centrifugal members 21 into frictional engagement with the outer periphery of the cylindrical member 23. Thus, the three centrifugal members 21 are caused to embrace the cylindrical member 23, and serve to connect the driving shaft 2 and the driven shaft 4.

While the driving shaft 2 is rotating about its axis at low speeds, for example, at the commencement of the internal combustion engine (not shown), the centrifugal members 21 are made to embrace the cylindrical member 23. Rotational drive of the driving shaft 2 is transmitted to the driven shaft 4 via the driving member 10, the centrifugal members 21 and the cylindrical member 23. As the rotational speed of the driving shaft 2 further increases, the rotational speed of the driven shaft 4 increases accordingly. Thus, centrifugal force acting upon the centrifugal clutch shoes 17 increases to press the shoes 17 against the inner circumference of the clutch drum 15. When a predetermined rotational speed is reached, the resultant centrifugal force acts to separate the centrifugal members 21 from the outer periphery of the cylindrical member 23 against the action of the springs 24. Therefore, the driving force of the driving shaft 2 is transmitted to the driven shaft 4 through the clutch drum 15 and the shoes 17. If a saw chain 7 is jammed while cutting a tree branch and an overload is applied to the driven shaft 4, the rotational speed of the driven shaft 4 is reduced. For this reason, the centrifugal force acting upon the shoes 17 is lowered, and thus the shoes 17 ceases from pressure contact with the clutch drum 15. In consequence, since the connection between the driving member 10 and the driven shaft 4 is released, the rotation of the driven shaft 4 is stopped and at the same time the level of a load acting upon the driving shaft 2 and the driving member 10 is reduced. Accordingly, since the rotational speed of the driving member 10 again increases, the centrifugal members 21 are maintained in a state away from the cylindrical member 23. After the overloaded state of the driven shaft 4 has been eliminated by removing the saw chain 7 from the tree branch in which it is jammed, the operation of the internal combustion engine is controlled to temporarily reduce the rotational speeds of the driving shaft 2 and the driving member 10. This speed control again causes the centrifugal members 21 to embrace the cylindrical member 23, and thus the driving force of the driving shaft 2 is transmitted to the driven shaft 4, thereby causing rotation of the driven shaft 4. In this state, when the rotational speed of the driving shaft 2 is again increased, the shoes 17 are forced against the clutch drum 15 as described previously to transmit the driving force to the driven shaft 4. Simultaneously, the centrifugal members 21 are separated from the cylindrical member 23, thereby achieving the state of the driving force being properly transmitted from the driving shaft 2 to the driven shaft 4.

What is claimed is:

1. An anti-overload centrifugal clutch, connecting a driving shaft to a driven shaft, the centrifugal clutch comprising a sleeve shaped driving member connected to the driving shaft and rotatably mounted with respect to and coaxially enclosing a portion of the driven shaft;

a clutch drum secured to the driving shaft by said sleeve shaped driving member;

a plurality of centrifugal clutch shoes engaged with the driven shaft for contact with and movement away from said clutch drum;

a plurality of centrifugal members having arcuate surfaces of radially inner sides of said respective centrifugal members and engaged with said driving shaft on said clutch drum;

a cylindrical portion on the driven shaft having a smooth outer periphery disposed in face-to-face relationship with said arcuate surfaces; and a spring acting on said centrifugal members to bring said arcuate surfaces of the radially inner sides of said respective centrifugal members into frictional contact with said outer periphery of said cylindrical portion, said centrifugal members releasing the embracing frictional contact when the rotation of the driving shaft reaches a predetermined rotational speed.

2. Am anti-overload clutch according to claim 1, wherein boss members extend from the driven shaft and
   said centrifugal clutch shoes are mounted for radial movement on said boss members.

3. An anti-overload clutch according to claim 1, wherein the driving and driven shafts are mounted axially of each other.

4. An anti-overload clutch according to claim 1, wherein said smooth outer periphery of said cylindrical portion of the driven shaft having a cylindrical surface of the driven shaft positioned to contact said arcuate surfaces.

5. An anti-overload clutch according to claim 1, wherein at least one of the shafts is rotatably supported in a machine body to allow both of the shafts to rotate relative to the machine body.

6. An anti-overload clutch according to claim 1, wherein the driving shaft and the driven shaft are coaxially disposed with said clutch drum, the driving force of the driving shaft being transmitted to the driven shaft through said clutch drum and said centrifugal clutch shoes at a lower predetermined rotational speed of the driving shaft than said predetermined rotational speed of said centrifugal members.

* * * * *